Jan. 7, 1964   F. V. CARUS   3,116,822
STRIPPING CONVEYOR APPARATUS FOR HANDLING
STACKS OR BUN PANS AND THE LIKE
Filed March 18, 1960   3 Sheets-Sheet 3
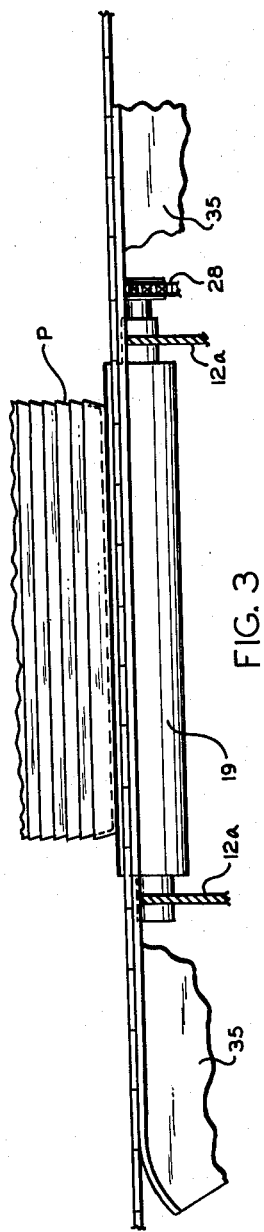
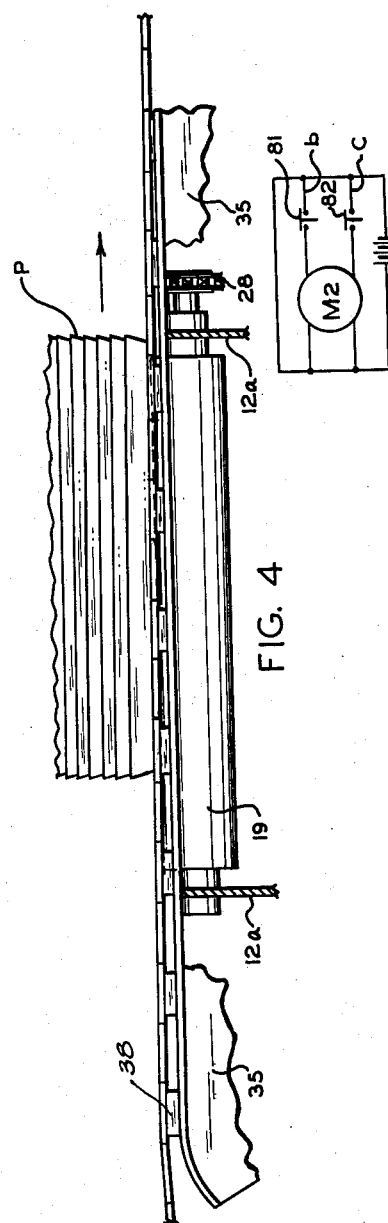
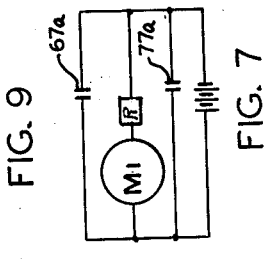
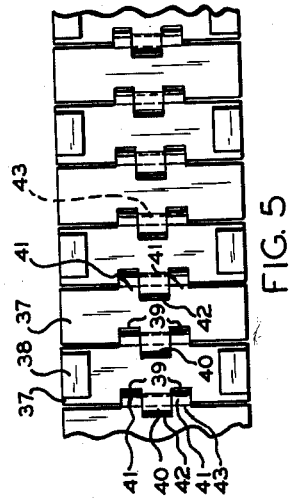
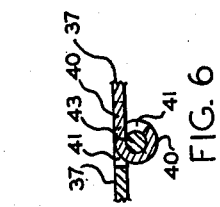
INVENTOR.
FRANKLIN VAUGHN CARUS
BY
ATTORNEYS United States Patent Office 3,116,822
Patented Jan. 7, 1964

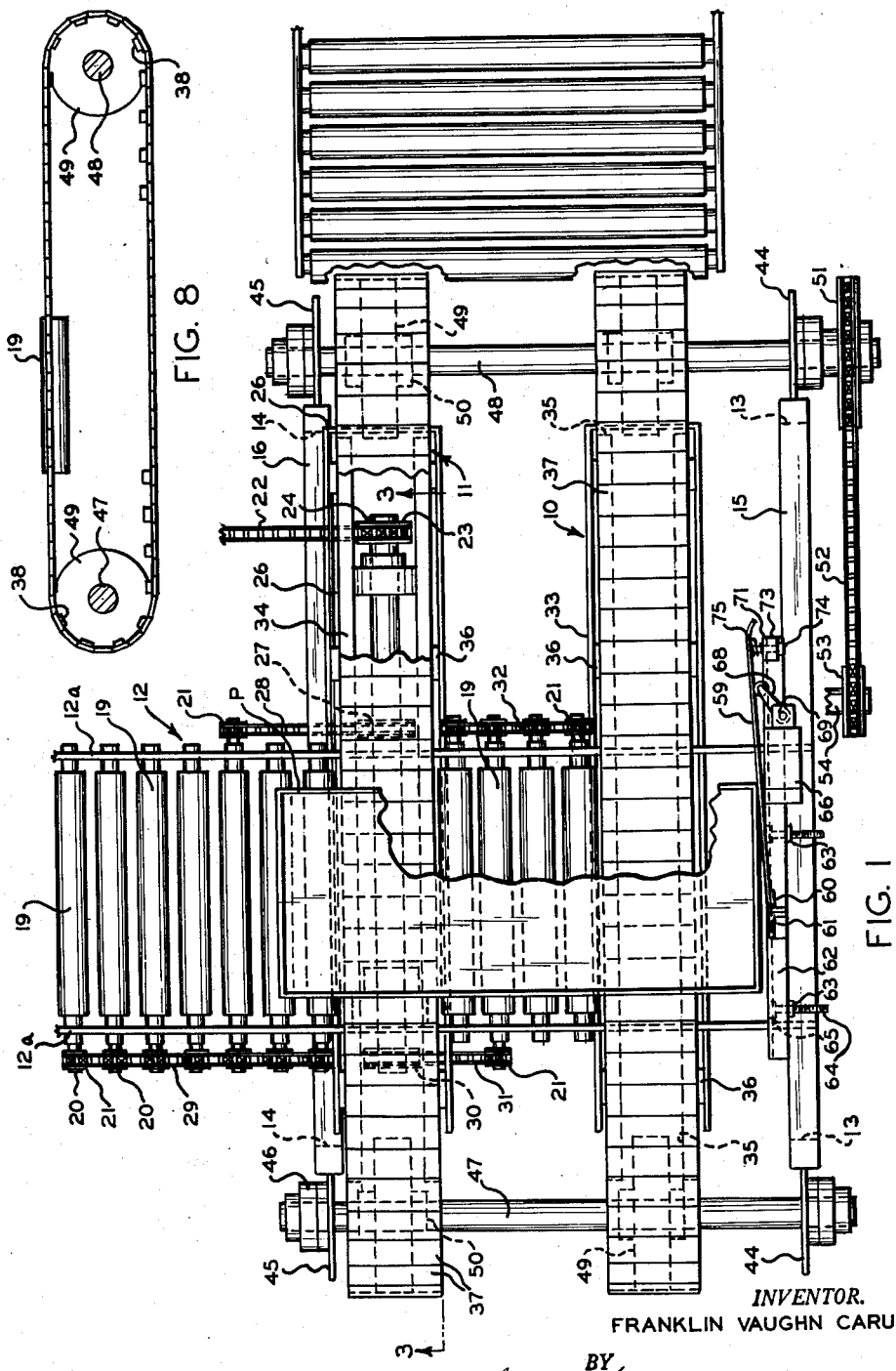

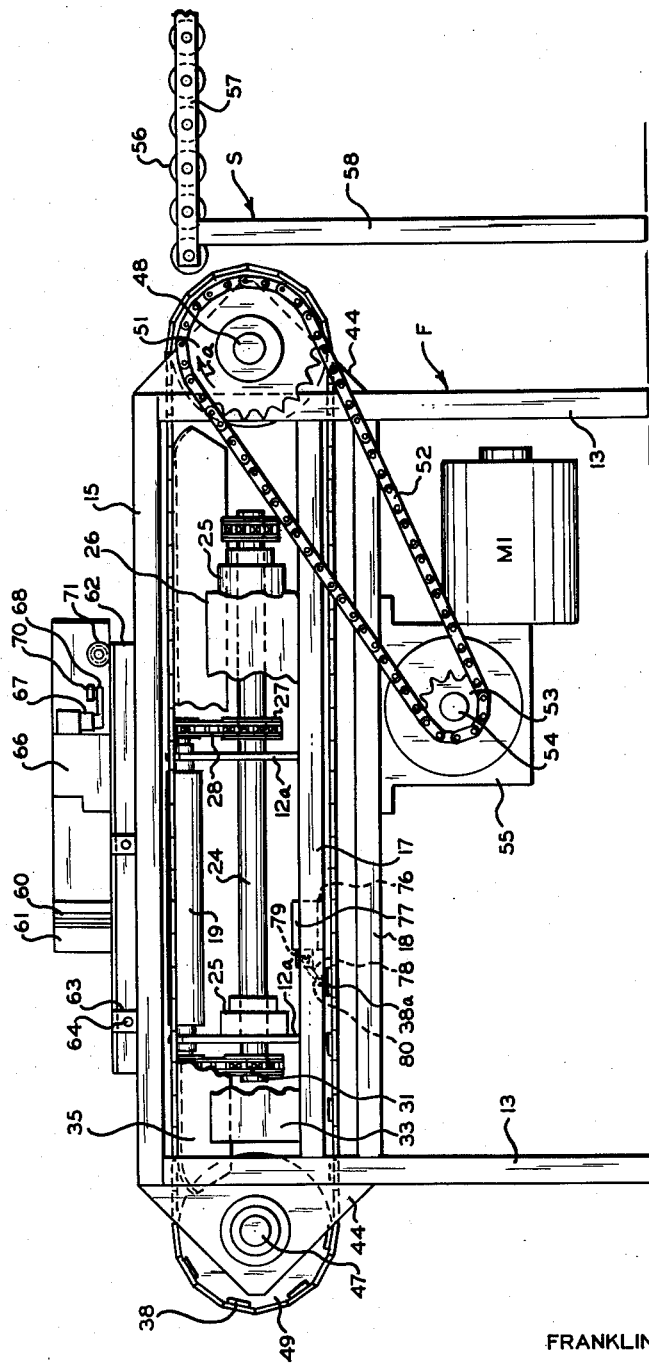

3,116,822
STRIPPING CONVEYOR APPARATUS FOR HANDLING STACKS OF BUN PANS AND THE LIKE
Franklin Vaughn Carus, Saginaw, Mich., assignor to Baker Perkins Inc., Saginaw, Mich., a corporation of New York
Filed Mar. 18, 1960, Ser. No. 15,887
8 Claims. (Cl. 198—21)

This invention relates to conveyor systems and more particularly to a conveyor for removing relatively high stacks of shallowly nested bun pans, bread pans, or the like from another conveyor and transporting them in a different direction.

In modern day bun baking assembly lines in bakeries it is necessary to move stacks of pans from a pan stacking machine to dough depositing machines or to locations of storage and, because the pans are very shallow and must be handled in vertically nested stacks of approximately thirty or more pans, with the stacks having a height of two and one half feet or more, considerable care must be exercised in handling them. Further, since pan stacks of the character described weigh in the neighborhood of 200 or more pounds, it is necessary that they be supported with care through their travel from one location to another. Accordingly, it is not only desirable that the pan stacks in their longitudinal movement be transported smoothly but also, when they are removed from one conveyor to another traveling in a different direction, that they be lifted or stripped very gradually.

One of the prime objects of the present invention is to provide conveyor apparatus of the character described in which take-off conveyors having runs extending crosswise to a delivery conveyor function as elevators during a portion of their transporting movement to lift the pan stacks progressively, and without jarring, from the delivery conveyor.

It is a further object of the invention to provide a greatly simplified construction of the type set forth in which the travel of the conveyor runs in the transporting direction is the only movement which need be provided to elevate the pan stacks sufficiently to remove them from the delivery conveyor. It is important to note that the instant apparatus, which presently will be described in detail, does not require independent pan elevating apparatus and performs the stripping function in substantially the plane of the delivery conveyor.

Another object of the invention is to provide conveyor apparatus of the type described which is extremely reliable in operation and simple in design so that its mechanical and electrical maintenance can be easily taken care of by general maintenance personnel employed by the bakery.

A further object of the invention is to provide a stripper conveyor designed to satisfactorily handle pan stacks of the weight and height mentioned which lends itself to a modification wherein the pan stacks may be selectively or alternately delivered in opposite directions to several dough depositing machines or the like.

Still a further object of the invention is to provide stripper conveyor apparatus at greatly reduced cost which is especially adapted to handle frankfurter and hamburger pans, and which can be readily adjusted to suit the transport of pans of different size.

Other objects and advantages of the invention will be pointed out specifically or will become apparent from the following description when it is considered in conjunction with the appended claims and the accompanying drawings, in which:

FIGURE 1 is a top plan view illustrating my conveyor system and showing a pan stack moving into the stripper conveyor actuating position on the delivery conveyor from which it is removed by the take-off or stripper conveyors, the take-off conveyors being illustrated only schematically in the interests of clarity;

FIGURE 2 is a front elevational view thereof;

FIGURE 3 is an enlarged, fragmentary, sectional view taken on the line 3—3 of FIGURE 1 at a time when the plates of the take-off conveyors are disposed below the level of the delivery conveyor rolls;

FIGURE 4 is a similar view taken at a time when the plates with cam blocks are elevating the stacks of pans above the level of the delivery conveyor and transporting them away;

FIGURE 5 is an inverse plan view of one of the take-off conveyors, illustrating one form of construction thereof;

FIGURE 6 is a fragmentary, elevational view further illustrating the hinged construction thereof;

FIGURE 7 is a schematically depicted, typical electrical control system for the apparatus;

FIGURE 8 is a diagrammatic, side elevational view of a modified form of take-off conveyor; and FIGURE 9 illustrates a control system for the modified form of the invention.

Referring now more particularly to the accompanying drawings and, in the first instance, to FIGURES 1–7 thereof, it will be seen that the conveyor system, which is illustrated in preferred form only, includes a frame structure generally designated F from which the two stripper or take-off conveyors generally designated 10 and 11 are supported and from which the front end of the delivery conveyor generally designated 12 may also be supported. The form of the frame structure is relatively unimportant and in the instant case, for the sake of simplicity of disclosure, it is illustrated as comprising front and rear supporting leg members 13 and 14 which are connected by front and rear upper rail members 15 and 16, front and rear intermediate rail members 17, and front and rear lowermost rail members 18.

The front and rear members 17 support the side plates 12a of conveyor 12, which, in the form of the invention illustrated, is a powered roll type conveyor having rotatable roller members 19 with reduced portions 20 journaled in the side plates 12a. Provided on the still further reduced terminal ends 20a of the rollers 19 are sprockets 21 for driving the rollers in a direction to move a stack of pans P forwardly as shown in FIGURE 1. The sprockets 21 may be driven from a chain 22, connected with an electric motor or other suitable source of power, and trained around a sprocket 23 keyed on a shaft 24 which is journaled by bearings 25. As shown in FIGURE 2, one bearing 25 is supported by the left roller conveyor side plate 12a and the other by a U-shaped support frame 26 (see also FIGURE 1) which extends between and separates the front four rollers 19 from the other rollers 19 and has an additional support function to be later mentioned.

Fixed on the shaft 24 intermediate its ends is a sprocket 27 driving one of the sprockets 21 and the roll 19 on which it is mounted through a chain 28, and also driving the other rolls 19 rearward of frame 26 through chain 29. The rollers 19 forwardly of frame 26, which may extend through slots in the side plates 12a, are driven from shaft 24 through a sprocket 30 keyed on the shaft, and a chain 31, which is trained around sprocket 30 and a sprocket 21 on the left end (FIGURE 1) of one of the front rollers 19. A chain 32 connects the sprockets 21 on the opposite ends of the forward rollers 19, as shown in FIGURE 1.

It will be seen that a U-shaped frame 33 extends through and is also supported by the conveyor side plates 18 forwardly of the anterior group of driven rollers 19 with the members 18 being similarly slotted to receive the sides of the member 33. Mounted on the frames 26 and 33 are elongate pairs of support rails 34 and 35, respectively, which are supported from the frames 26 and 33 by means of spacer blocks 36. The pairs of guides 34 and 35, which are supported on a predetermined level, form elongate conveyor supports.

The conveyors 10 and 11, which are schematically depicted in FIGURE 1, are made up of plates 37 which carry dependent cam blocks 38 at the side edges thereof and plates 37, which are not provided with cam blocks 38. Each of the plates 37 (see FIGURE 5) may be formed on one (the left) end edge with spaced recesses 39 and with a projecting portion 40 between them. Also, each plate along its opposite end edge has projecting portions 41 and a recess 42 between them and it will be seen that the projecting portions 40 are received in the recesses 42 and the projecting portions 41 in the recesses 39 when the plates 37 are arranged in end-to-end, intermeshing relation as shown in FIGURE 5. Pins 43 may be welded to the members 41 in each case and the terminal ends of the portions 40 may be bent around the pins 43 to pivotally receive them, as shown in FIGURE 6, and thereby hinge the plates 37 one to another and provide the necessary flexibility.

Mounted on the front and rear support posts 13 and 14 are front and rear bearing support plates 44 and 45 which are provided with bearings 46 for journaling plate conveyor end shafts 47 and 48. Disk or wheel members 49 are keyed on the shafts 47 and 48 to furnish end supports for the conveyors 10 and 11 and spacer members 50 maintain the members 49 in adjusted position. Mounted on the shaft 48 to drive the conveyors 10 and 11 is a sprocket 51 which is connected by a chain 52 to an electric motor M–1, the chain 52 being trained around a sprocket 53 mounted on the output shaft 54 of a gear reduction unit 55 which receives the input power of the motor M–1. When the motor M–1 is energized to drive the sprocket 51 in the direction indicated by the arrow "a," the pan sets P will be delivered to a receiving roller conveyor structure generally designated S which includes rotatable, powered roller members 56 journaled by support plates 57 which are supported by legs 58 or the like.

The motor M–1 is energized when the pan stacks P move forwardly on the conveyor 12 sufficiently to engage and depress a pan stop and guide plate 59 which is pivoted or hinged as at 60 to an angle bracket 61 fixed on an angle rail 62 which is supported by front top rail 15. Plates 63 secured to the rail 15 are provided with threaded openings to pass bolt members 64 which are rotatably supported by and extend through the angle rail 62 and permit it to be adjusted forwardly and rearwardly as desired to accommodate different pan sizes.

A bracket 66 fixed to the rail 62 mounts a microswitch 67 of conventional design which includes a lever arm 68 pivotally mounted by the microswitch 67 as at 69. It will be seen that arm 68 carries a roller 70 normally spring pressed into engagement with the pan guide 59 (see FIGURE 1) and when the pan guide 59 is pivoted to swing outwardly about the hinge 60 by a stack of pans P, the arm 68 is pivoted and the normally open contacts 67a of the microswitch (see FIGURE 7) are closed to close or make a conventional electromagnetic holding relay R and start the motor M–1 driving conveyors 10 and 11. A member 71 fixed on rail 62 has an opening 73 freely passing a bolt member 74 which is fixed at its opposite end to the pan guide 59. Return spring 75 encircling bolt 74 and arranged between the members 71 and 59 operates to return the pan guide 59 to normal position.

For stopping the conveyors 10 and 11 after they have traveled a predetermined distance, a plate 76 spanning the frame rails 17 mounts a microswitch 77 of conventional design having an arm 78 pivoted as at 79 to the microswitch housing. Arm 78 carries a follower roller 80 and is maintained at a level such that the cam 38 of greatest thickness (38a) pivots arm 78 upwardly about the pivot point 79 and opens the contacts 77a to break the relay R and stop the motor M–1.

In the operation of the conveyor system a pan stack P is moved from a pan stacking machine by the roller conveyor 12 to the pan guide 59, as shown in FIGURE 1. As shown in FIGURE 3, the plates 37 of the conveyors 10 and 11 are disposed below the level of the rollers 19 at this time in the positions in which they are shown in FIGURES 2 and 3. As the pan stack P is moved forwardly from the position in which it is shown in FIGURE 1 to pivot the pan guide 59 outwardly, the switch arm 68 is forced outwardly and closes the relay R in the motor M–1 circuit. Conveyors 10 and 11 are accordingly started and as the cam plates 38 successively engage the guide rails 34 and 35 the pan stack P is engaged and gradually lifted above the level of rollers 19, as shown in FIGURE 4, and transported to the receiving conveyor structure S. In actual practice, the amount the pan stacks are lifted above the level of roller conveyors R is about ¼ inch.

When the endmost cam plate 38a reaches the switch roller 80 which is normally disposed in its path, the switch arm 78 is pivoted upwardly and the relay R is opened to stop the motor M–1. The roller 80 clears the other cams 38. When the next succeeding pan stack again is moved by the roller conveyor 12 into engagement with the pan stop and pan guide 59 to operate the microswitch 67, the holding relay R is again "made" and the operation is repeated. During the transfer from conveyor 12 to conveyors 10 and 11, the pan stacks are handled so smoothly that the stack is not disturbed and the pans do not topple, and it should be apparent that I have perfected a relatively simple yet highly efficient and reliable mechanism for accomplishing the desired purpose.

The design also lends itself very well to an adaptation in which the pans can be moved from the delivery conveyor 12 sidewise in either direction. For instance, in FIGURE 1 if it were desired to dispose the receiving conveyor structure S at the left end of the conveyors 10 and 11 as well as at the right end to supply pan stacks to two dough depositing machines alternately, as is sometimes desirable in actual practice, plate conveyors of the type shown in FIGURE 8 can be employed.

Except as otherwise stated, the construction of this modification of the invention is exactly the same as the construction of the units shown in FIGURES 1–6. However, the plate conveyor structures 10 and 11 differ in that a series of cam plates 38 is shown at the right end as well as at the left end. In FIGURE 9 a very simple form of electrical control system is shown in which a reversing motor M–2, which substitutes for the former motor M–1, is provided to selectively drive the conveyors 10 and 11 in either direction. If push button 81 is depressed by the operator to close the motor circuit "b" the upper run of the conveyor is moved from left to right, as in FIGURES 1–6. However, if the operator instead depresses push button 82 in circuit line C, reversing circuit of the motor M–2 is energized and conveyors 10 and 11 move from right to left. Obviously, conventional switches and relays could be employed to provide an automatic operation in which the system alternately delivered to opposite ends of the conveyors 10 and 11. Whether moved in one direction or the other, the conveyors 10 and 11 in this form of the invention would make a complete circuit back to the starting position in which they are shown in FIGURE 8 whence they would be stopped to permit a new stack of pans to move from conveyor 12 to a position above them.

It is to be understood that the drawings and descriptive matter are in all cases to be interpreted as merely illustrative of the principles of the invention rather than as limiting the same in any way, since it is contemplated

I claim:

1. In apparatus for stripping a conveyor or the like of articles such as pan stacks and traveling them angularly to the previous direction of travel, the combination with said first conveyor of at least one traveling conveyor with a run extending substantially at the level of the said first conveyor and adjacent thereto; means for driving the said run of said latter conveyor in one direction of travel; a guide underlying the said run of the latter conveyor extending horizontally from one terminal end to the other; and longitudinally extending cam means of increasing height in the direction of travel secured beneath said run of the latter conveyor riding on said guide means and lifting said articles progressively upwardly from the level of said first conveyor in an inclined path of travel to remove them from the first conveyor gradually and transport them away.

2. In apparatus for stripping a support surface of articles such as pan stacks, the combination with said support surface of at least one adjacent traveling conveyor with a run presenting a substantially continuous flat top surface extending substantially at the level of the adjacent portion of the said support surface; means for driving said run of the conveyor in a direction of travel; at least one substantially horizontal guide rail means underlying the said run of the latter conveyor; and longitudinally extending cam means of increasing height in the direction of travel mounted on the underside of said run of the conveyor riding on said guide rail means and lifting said conveyor and the articles progressively upwardly from the level of said support surface to remove them and transport them away.

3. In apparatus for stripping the delivery end of a conveyor of articles such as pan stacks being transported thereby, and traveling them angularly to the previous direction of travel, the combination with said first conveyor of at least one traveling conveyor with a run extending substantially at the level of the said conveyor and transversely adjacent thereto; a transversely extending stop at the delivery end of said first conveyor beyond said run; means for driving said latter conveyor; at least one guide rail underlying the said run of the latter conveyor; longitudinally extending cam means mounted to the underside of said run of the conveyor riding on said guide rail and raising said run of the conveyor to lift said articles progressively upwardly and remove them from the first conveyor gradually while transporting them away; switch means for starting said latter conveyor engaged when said article reaches said stop; and switch means for stopping said latter conveyor after one article has been lifted and transported to allow a second article to reach said stop.

4. In apparatus for stripping a conveyor of articles such as pan stacks being transported thereby and traveling them angularly to the previous direction of travel, the combination with said first conveyor of at least one endless conveyor with a run extending substantially at the level of the said first conveyor and crosswise through the first conveyor interadjacent its ends; a motor for driving said latter conveyor; at least one guide rail member underlying the said run of the latter conveyor; and longitudinally extending cam means mounted on the underside of said run of the conveyor riding on said guide rail and lifting said articles progressively upwardly from the level of said first conveyor to remove them from the first conveyor gradually and transport them away.

5. In apparatus for stripping a conveyor of articles such as pan stacks being transported thereby and traveling them angularly to the previous direction of travel in one of two opposite directions, the combination with said first conveyor of at least one traveling conveyor having a run extending substantially at the level of the said conveyor crosswise thereto and extending from both sides thereof; means for driving said latter conveyor in either direction; at least one guide rail member underlying the said run of the latter conveyor; and longitudinally extending means, including cam means of progressing depth in one direction and cam means of progressing depth in the opposite direction, incorporated with said latter conveyor, riding on said guide rail and lifting said articles progressively upwardly to remove them from the first conveyor gradually and transport them away in either direction.

6. In apparatus for stripping a generally longitudinal first conveyor of articles such as pan stacks and transporting them angularly to the previous direction of travel, the combination with said generally longitudinal first conveyor of; a pair of spaced apart, generally parallel, endless take-off conveyors having upper runs intersecting the first conveyor and extending transversely to said first conveyor; said pair of conveyors comprising side-by-side plate members hingedly connected one to another; a certain group of said plate members having a series of cams of progressively increasing depth fixed to the underside thereof and another series of plate members being free of cams; elongate, transversely extending guide means under said runs at a level to support the plates without blocks just below the upper surface of said first conveyor, and adapted to be engaged by the progressively increasing cams as they travel over the guides to elevate said plates progressively above the upper surface of the said first conveyor and lift and transport the articles from said first conveyor.

7. In apparatus for stripping the delivery end of a generally longitudinal first conveyor of articles such as pan stacks and transporting them angularly to the previous direction of travel, the combination with said generally longitudinal first conveyor of; a pair of spaced apart, parallel, endless take-off conveyors having upper runs intersecting the first conveyor and extending transversely to said first conveyor; motor means for driving said endless conveyors; a transversely extending, pivotally mounted pan stop and pan guide at the delivery end of said first conveyor beyond said runs; said pair of conveyors comprising side-by-side plate members hingedly connected one to another; a certain group of said plate members having a series of individual cam blocks of progressively increasing depth, each fixed to the underside of a plate member, and another row of plate members being free of cam blocks; elongate, transversely extending guide members extending horizontally from end to end thereof under said plates at a level to support the plates without blocks just below the upper surface of said first conveyor, and adapted to be engaged by the progressively increasing cam blocks as the plates travel over the guides to elevate said plates progressively above the upper surface of the said first conveyor; switch means on said pan stop connected with said motor means to start the same when a pan stack engages said pan stop; and switch means, connected with said motor means for stopping the motor means, disposed in the path of travel of at least one of said cam blocks for stopping the motor means at a predetermined time.

8. In apparatus for stripping a generally longitudinal first conveyor of articles such as pan stacks and transporting them angularly to the previous direction of travel, the combination with said generally longitudinal first conveyor of; a pair of spaced apart, generally parallel, endless take-off conveyors having upper runs intersecting the first conveyor and extending transversely to said first conveyor; motor means for driving said conveyors in either direction; said pair of conveyors comprising side-by-side plate members hingedly connected one to another; a certain group of said plate members having a series of cam blocks of progressively increasing depth in one direction, another group having a series of cam blocks of progressively increasing depth in another direction, and other plates between said groups being without blocks; elongate, transversely extending guide members under said plates at a level to support the plates without blocks just below the upper surface of said first conveyor, and adapted to be engaged by the progressively increasing cam blocks as the plates travel over the guides in either direction to elevate said plates progressively above the upper surface of the said first conveyor and lift and transport the articles from said first conveyor; and means for selectively driving said motor means in either direction.

References Cited in the file of this patent

UNITED STATES PATENTS 2,809,739     Temple _____ Oct. 15, 1957

FOREIGN PATENTS 141,957     Sweden _____ Sept. 1, 1953